United States Patent
Legrand

(10) Patent No.: US 7,370,424 B2
(45) Date of Patent: May 13, 2008

(54) CUTTING STRING FOR PLANT CUTTING APPLIANCE

(75) Inventor: Emmanuel Legrand, Villeneuve (FR)

(73) Assignee: Speed France, Arnas (FR)

( * ) Notice: Subject to any disclaimer, the term of this patent is extended or adjusted under 35 U.S.C. 154(b) by 0 days.

(21) Appl. No.: 11/006,110

(22) Filed: Dec. 7, 2004

(65) Prior Publication Data

US 2005/0188547 A1 Sep. 1, 2005

Related U.S. Application Data

(63) Continuation of application No. PCT/FR03/01727, filed on Jun. 10, 2003.

(30) Foreign Application Priority Data

Jun. 7, 2002 (FR) ....................... PCT/FR02/01959

(51) Int. Cl.
*A01D 34/416* (2006.01)
(52) U.S. Cl. ................... 30/347; 30/276; 428/373
(58) Field of Classification Search ................ 30/276, 30/347; 56/12.7; 428/373, 374, 397
See application file for complete search history.

(56) References Cited

U.S. PATENT DOCUMENTS

| | | | |
|---|---|---|---|
| 4,118,865 A | 10/1978 | Jacyno et al. | |
| 4,869,055 A * | 9/1989 | Mickelson | ................... 56/12.7 |
| 4,905,465 A | 3/1990 | Jones et al. | |
| 5,048,278 A | 9/1991 | Jones et al. | |
| 5,430,943 A * | 7/1995 | Lee | ................ 30/347 |
| 5,687,482 A | 11/1997 | Behrendt | |
| 5,713,191 A | 2/1998 | Welton | |
| 5,761,816 A | 6/1998 | Morabit et al. | |
| 5,896,666 A | 4/1999 | Iacona et al. | |
| 5,996,233 A | 12/1999 | Morabit et al. | |
| 6,061,914 A * | 5/2000 | Legrand | ...................... 30/347 |
| 6,124,034 A | 9/2000 | Proulx et al. | |
| 6,240,643 B1 | 6/2001 | Civalleri | |
| 6,347,455 B2 | 2/2002 | Brant et al. | |
| 6,601,373 B1 | 8/2003 | Legrand | |
| 6,910,277 B2 * | 6/2005 | Proulx et al. | ................. 30/276 |
| 2002/0023356 A1 | 2/2002 | Skinner et al. | |
| 2005/0081389 A1* | 4/2005 | Legrand | ...................... 30/276 |
| 2005/0172501 A1* | 8/2005 | Fogle | .......................... 30/347 |

FOREIGN PATENT DOCUMENTS

| | | |
|---|---|---|
| EP | 1 057 396 A1 | 12/2000 |
| EP | 1 129 609 A1 | 9/2001 |
| JP | 07 184446 A | 7/1995 |
| WO | WO 99/40773 A1 | 8/1999 |

* cited by examiner

*Primary Examiner*—Hwei-Siu C. Payer
(74) *Attorney, Agent, or Firm*—Alston & Bird LLP

(57) ABSTRACT

A plant or vegetation cutting device which comprises a rotary cutting head and at least one cutting filament or string extending radially from the head, such that upon rotation of the head, the string is extended by centrifugal force and cuts through the plants or vegetation. The string is profiled in a generally uniform manner along its length and it comprises a main body whose width/height ratio is between about 1.2 and 2. A co-extruded cutting appendage may be joined along the leading edge and/or the trailing edge of the main body.

4 Claims, 2 Drawing Sheets

CUTTING STRING FOR PLANT CUTTING APPLIANCE

CROSS REFERENCE TO RELATED APPLICATION

The present application is a continuation of international application PCT/FR03/01727, filed 10 Jun. 2003, and which designates the U.S. The disclosure of the referenced application is incorporated herein by reference.

BACKGROUND OF THE INVENTION

This present invention generally relates to plant cutting appliances, in particular brush cutters.

For several years, there have been developed different forms of cutting strings or filaments which are designed to be mounted on a cutting head, driven by an electric or thermal engine, so that the rapid rotation of the head drives the string or strings so that they tend to adopt a rectilinear extension under the effect of the centrifugal force. These strings are typically formed of a polyamide extrusion.

The oldest of these strings have a circular section and are smooth along their entire length, and recently developed strings have various sections, designed to improve the cutting quality (presence of edges, etc.) and/or the longevity of the string, and/or to reduce the noise of the appliance in operation by acting on the turbulences.

Thus the prior strings may include edges, grooves, furrows, or local deformations, along their entire length.

Furthermore, there are strings called aerodynamic strings, for example in the form of an airplane wing profile, water drop, or ellipse (see for example, U.S. Pat. No. 5,761,816).

Such strings have certain advantages linked to their improved penetration in the air. For example, less power is required for the engine, and they may also provide less operating noise, and overall a better cutting efficiency.

Such strings, which present a limited height, nevertheless present the inconvenience of being fragile. In particular, the accumulated rotation speed of these profiled strings allows increasing the intensity of shocks against the plants, and the small height of the string significantly increases its risk of breaking. The use of such strings for large jobs is therefore limited.

It is an object of this invention to provide new cutting strings that present advantages that are similar to those offered by existing profiled strings in terms of air penetration, but that are more robust and better adapted for large jobs.

SUMMARY OF THE INVENTION

The above and other objects and advantages of the invention are achieved by the provision of a cutting string for a plant cutting appliance such as a brush cutter, an edge trimmer, etc. that includes a rotating cutting head that can hold the cutting string. The string is profiled and generally uniform in length, and it has a main body whose ratio between its width, measured in the cutting direction, and its height is greater than about 1.2 and lower than about 2.

Some preferred, but not limiting, aspects of the string according to the invention are the following:
  the string has either a live cutting edge, or a generally flat work face, or a rounded work face, or even a toothed work area.
  the string is either mono-block, or composed by the main body of an initial material, with one or several cutting appendages of a second material that is different from the first, in which case the ratio between the width and height of the string is measured on the main body. In the case of the latter embodiment, the main body and the cutting appendages are preferably created by co-extrusion.
  the string includes two cutting appendages placed on either side of the main body.

The invention also provides a cutting assembly for a plant cutting appliance such as a brush cutter, an edge trimmer, etc. that includes a rotating cutting head with at least one cutting string such as defined above and that extends from the cutting head and is maintained in a specific direction.

Lastly, the invention provides a plant cutting appliance such as a brush cutter, an edge trimmer, etc., characterised in that it includes a cutting assembly as described above, and an engine to drive the cutting assembly in rotation.

Certain preferred but not limiting aspects of this cutting assembly are further described below.

BRIEF DESCRIPTION OF THE DRAWINGS

Other aspects, objectives and advantages of this invention will be clearer upon reading the detailed description that follows the preferred embodiments of the invention, given as non-limiting examples and referring to the attached figures, in which.

DETAILED DESCRIPTION OF THE PREFERRED EMBODIMENTS

Figure 1:
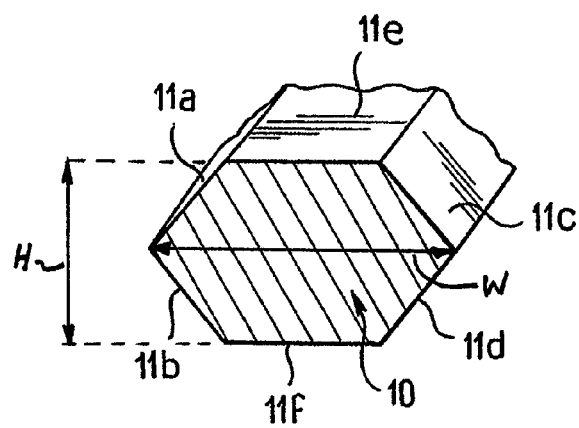
FIGS. 1 to 7 comprise sectioned end views of different cutting string profiles according to the invention.

Firstly, with reference to FIG. 1, schematically represented is a cutting string or filament 10 for plant cutting appliances (edge cutters, descrambling machines, etc.), created normally using a polyamide extrusion.

The string according to this first embodiment presents a uniform section over its entire length, here in an irregular hexagonal shape. More specifically, there is a first side composed of two faces 11a, 11b which are pitched at about 90 degrees with respect to each other and at about 45 degrees with respect to a horizontal median plane. On the opposite side, two other faces 11c, 11d, are similarly but reversely pitched. Also two horizontal junction faces 11e, 11f are provided on the top and bottom, respectively. The pairs of faces 11a, 11b on the one hand, and 11c, 11d on the other, form live edges for cutting plants or brush.

The ratio between the width W of the string and its height H is larger than about 1.2 and smaller than about 2, here with a value of about 1.6. Indeed, we have verified that this range of values allows taking advantage of good aerodynamics, with the advantages mentioned above, and at the same time good robustness. All this is combined with the cutting efficiency provided by live edges.

Figure 2:
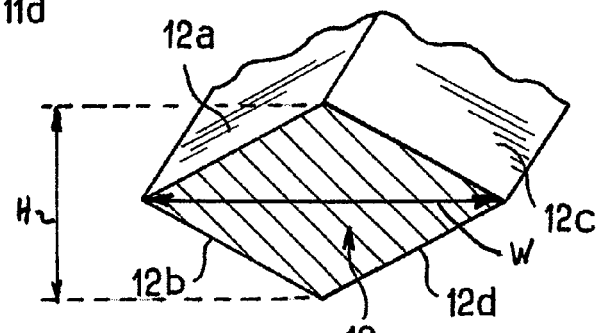

FIG. 2 illustrates a second embodiment of the invention. Here, the string 10 is configured to represent a lozenge section with two faces 12a, 12b that define a first cutting edge and two opposite faces 12c, 12d that define a second cutting edge. The ratio between the width and the height of the string here is about 1.8.

Figure 3:
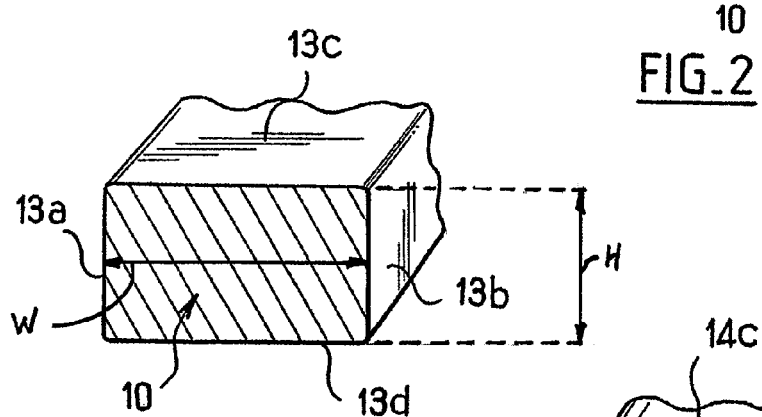

FIG. 3 represents a third embodiment of the string whose section is rectangular. The plants are impacted by one of the two flat faces 13a, 13b, which can result in a type of crushing effect. The top and bottom faces of the string are identical in 13c, 13d. Furthermore, the string here presents a transverse section surface that is maximum for a given height and width; its robustness is maximum and compensates for the absence of a cutting splicer.

The ratio between the width and the height of the string in this example is about 1.65.

Figure 4:
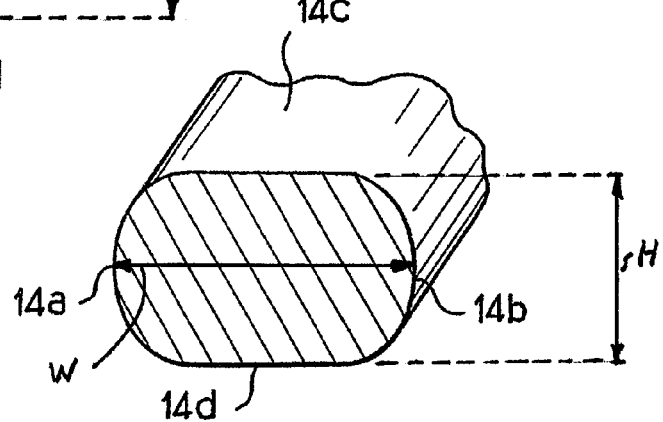

A string according to a fourth embodiment of the invention is illustrated in FIG. 4. It presents an oval section with two side work rounded faces 14a, 14b and two flat top and bottom faces, respectively 14c and 14d.

With respect to the embodiment in FIG. 4, the aerodynamic and cutting efficiency are improved, without significantly affecting the robustness.

The ratio between the width and height of the string here is 1.6.

Figure 5:
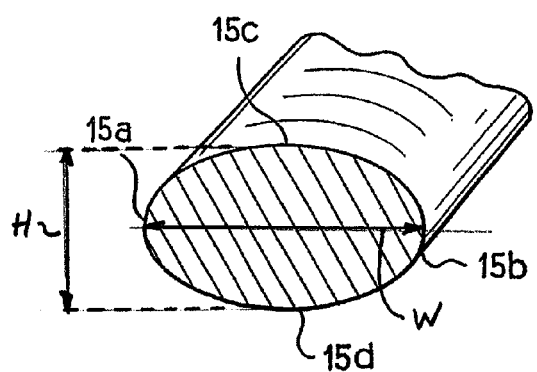

FIG. 5 illustrates a fifth embodiment of the string, in which the transverse section is essential elliptical in shape, with two plant attack regions 15a, 15b whose curves are more pronounced than the top and bottom regions 15c and 15d.

Figure 6:
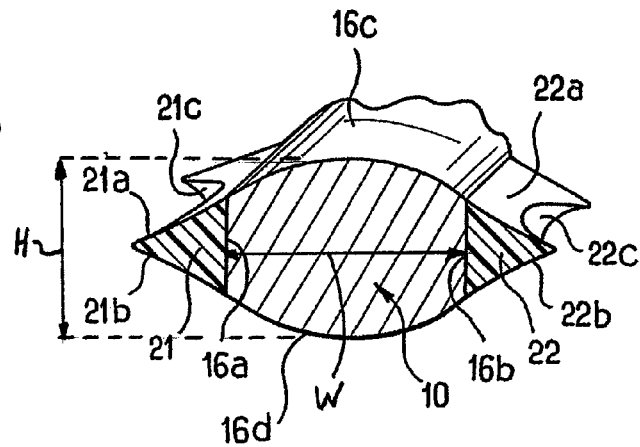

FIG. 6 illustrates an embodiment of the cutting string according to the invention, made with two materials. A main body 10, made, for example, with ordinary polyamide, has a generally elliptical section with a large horizontal axis because it is truncated laterally by two vertical faces 16a, 16b. These vertical faces are inter-joined by a rounded top face and a rounded bottom face, respectively 16c, 16d.

The string also includes two appendages, respectively 21 and 22, preferably made by co-extrusion of a material, such as a polyamide or co-polyamide, that is more resistant than that of the body 10. These appendages have at the level of the cutting teeth a triangular section that extends from face 16a or 16b, respectively, with a top pitched face and a bottom pitched face, respectively 21a, 21b for appendage 21 and 22a, 22b for appendage 22. The successive teeth are separated by rounded craters, respectively 21c, 22c, formed for example by conformation rollers made of material that is partially solidified in the extrusion manufacturing process, or by cutting in the solidified material.

In this embodiment, it is the ratio between the width and the height of only the body 10 that is taken into account; this ratio here is about 1.35.

Note here that all the embodiments of the invention described until now are symmetrical; that is, the string has two work regions that are identical. This allows, notably, in the case of a string strand maintained with a given direction in a descrambling head, inverting the position of the string when its first work region has worn.

Figure 7:
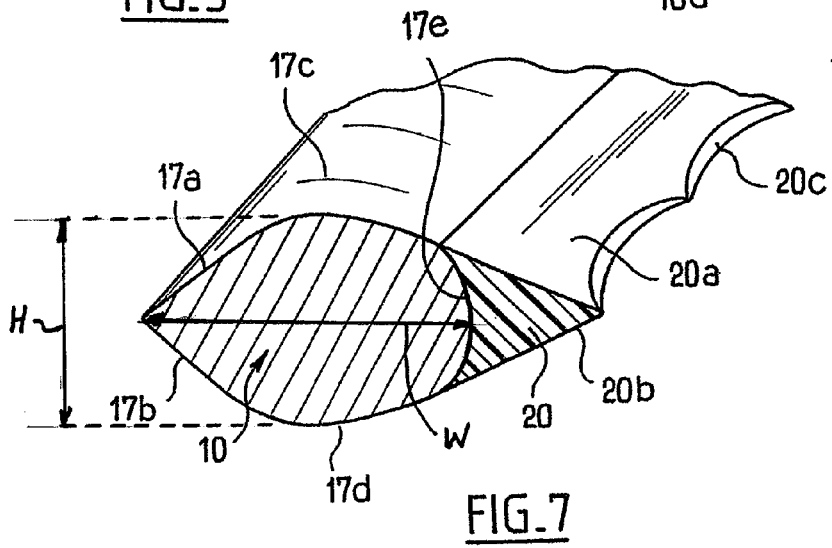
Figure 8:
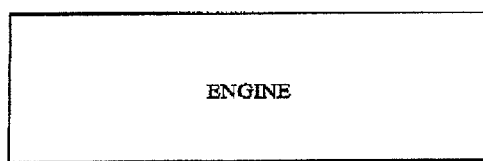
FIG. 8 is a schematic representation of the plant cutting appliance of the present invention.

FIG. 7 illustrates a seventh embodiment of the invention, in which the main body 10 of the string presents an aerodynamic leak region, with two pitched faces 17a, 17b that join into a live leak edge, and a rounded attack region 17e, joined to the two leak faces 17a and 17b by the top and lower faces, respectively 17c and 17d, with less pronounced curvatures. The attack face 17e receives, preferably by co-extrusion, a toothed work section or appendage 20 that has, at the teeth level, a triangular section with pitched top and bottom faces, respectively, 20a, 20b and craters 20c separating the teeth.

In this example, the ratio between the width and height of the body 10 is about 1.55.

This string represents an excellent compromise between aerodynamics, robustness, and cutting efficiency.

Note here that with all the strings of this invention, the head of the cutting appliance is equipped with fixtures or devices for maintaining the string(s) in the working direction; that is, with the large axis of the string section extending horizontally, or essentially horizontally.

Of course, several variants can be attributed to the invention.

Firstly, a string according to the invention can include any deformation, channel, nerve, etc. which is traditionally used to contribute to the reduction of operating noise.

Next, a string according to the invention can be made of two different materials, or additionally, notably by co-extrusion or by the application on a mono-block string of a coating with a specific function, notably anti-wear and tear.

Furthermore, each of the strings according to the invention can be equipped with appendages that form cutting teeth in at least one of the two side regions. In the case where these appendages are identical on both sides, the string can be used in one direction or another, or in one direction and then in another.

Furthermore, depending on the diameter of the string, the string can be used either as individual strands with a specific length (large diameter strings, for large jobs,) or as bobbins in the case, notably, of an automatic bobbin winder (small diameter strings, for turf.) Typically, depending on the application, the section of the string will be included between about 2 and 20 $mm^2$.

That which is claimed:

1. A cutting string for a plant cutting appliance that includes a rotating cutting head powered by an engine and that can retain the string; said string being profiled in a uniform manner along its length, and presenting a uniform section along its length, and wherein the string comprises a main body having in cross section an outer periphery whose ratio between the width, measured in a cutting direction, and the height is constant along the whole length of said string and is greater than about 1.35 and less than about 2, wherein said main body is of a first material, and at least one cutting appendage of a second material that is different from the first material, and in that the ratio between the width and the height of the string is measured on the main body, and wherein the main body has at least one end face which mounts the at least one cutting appendage, and wherein the at least one cutting appendage is of generally triangular cross section, with successive teeth formed at the leading edge of the appendage which are separated by rounded craters.

2. The string according to claim 1, wherein the main body is truncated by vertical opposite end faces, with a cutting appendage of the defined configuration adhered to each of the opposite end faces.

3. A cutting string for a plant cutting appliance that includes a rotating cutting head powered by an engine and that can retain the string; said string being profiled in a generally uniform manner along its length, and wherein the string comprises a main body whose ratio between the width, measured in a cutting direction, and the height is greater than about 1.2 and less than about 2, wherein said main body is of a first material, and the string further comprises at least one cutting appendage of a second material that is different from the first material, and in that the ratio between the width and the height of the string is measured on the main body, and wherein the main body has at least one end face which mounts the at least one cutting appendage, and wherein the at least one cutting appendage is of generally triangular cross section, with successive teeth formed at the leading edge of the appendage which are separated by rounded craters.

4. The string according to claim 3 wherein the main body has a second end face which faces opposite from said one end face, with the second end face mounting a second cutting appendage which has a generally triangular cross section, with successive teeth formed at the leading edge of the second appendage which are separated by rounded craters.

* * * * *